United States Patent
Meyer et al.

(10) Patent No.: US 12,179,706 B2
(45) Date of Patent: Dec. 31, 2024

(54) SEAT ARRANGEMENT FOR A MOTOR VEHICLE

(71) Applicant: Ford Global Technologies, LLC, Dearborn, MI (US)

(72) Inventors: Sebastian Meyer, Monheim am Rhein (DE); Thorsten Klein-Hitpass, Cologne (DE); Jan Marco Baumeister, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 17/961,811

(22) Filed: Oct. 7, 2022

(65) Prior Publication Data
US 2023/0109999 A1    Apr. 13, 2023

(30) Foreign Application Priority Data

Oct. 7, 2021 (DE) .......................... 102021126009.4

(51) Int. Cl.
*B60R 7/04* (2006.01)
*B60N 2/22* (2006.01)
*B60N 2/90* (2018.01)

(52) U.S. Cl.
CPC ............... *B60R 7/043* (2013.01); *B60N 2/22* (2013.01); *B60N 2/90* (2018.02)

(58) Field of Classification Search
CPC .. B60R 7/043; B60N 2/22; B60N 2/90; B60N 2002/0216; B60N 2/04
USPC .......................... 296/37.15, 65.03; 297/188.1
See application file for complete search history.

(56) References Cited

U.S. PATENT DOCUMENTS

| | | | |
|---|---|---|---|
| 6,106,044 A | 8/2000 | Schlachter | |
| 6,877,807 B2 | 4/2005 | Mizuno et al. | |
| 7,121,606 B2 * | 10/2006 | Khan | B60R 7/043 297/188.1 |
| 10,336,262 B2 | 7/2019 | Mozurkewich et al. | |
| 10,926,708 B2 * | 2/2021 | Gill | B60N 2/02 |
| 2002/0005649 A1 * | 1/2002 | Hofmann | B60N 2/305 297/188.1 |
| 2016/0200258 A1 * | 7/2016 | Chawlk | B60R 7/043 296/37.14 |

FOREIGN PATENT DOCUMENTS

CN            110303962 A  * 10/2019  ............... B60N 2/90

\* cited by examiner

*Primary Examiner* — Amy R Weisberg
*Assistant Examiner* — Denise L. Esquivel
(74) *Attorney, Agent, or Firm* — Vichit Chea; Price Heneveld LLP

(57) ABSTRACT

A seat arrangement for a motor vehicle, having a vehicle seat with a backrest and a seat part which is arranged in a seating position above a storage region and at least partially covers on the upper face an access opening to the storage region, which is configured in a seat substructure, and is pivotable about a seat pivot axis into a folded-up position in order to uncover the access opening. In order to permit a flexible and efficient use of the storage space in the region of the vehicle seat, the seat arrangement has at least one storage container with a wall which is configured around the periphery to the side and on the lower face, the storage container being able to be inserted into the storage region through the access opening and being able to be received therein to prevent displacement in the horizontal direction.

15 Claims, 3 Drawing Sheets

SEAT ARRANGEMENT FOR A MOTOR VEHICLE

CROSS-REFERENCE TO RELATED APPLICATION

This application claims foreign priority benefits under 35 U.S.C. § 119 (a)-(d) to German Patent Application No. 102021126009.4 filed on Oct. 7, 2021, which is hereby incorporated by reference in its entirety.

FIELD OF THE DISCLOSURE

The present disclosure generally relates to vehicle seating, and more particularly relates to a seat arrangement for a motor vehicle.

BACKGROUND OF THE DISCLOSURE

In many motor vehicles, such as passenger motor vehicles, there is typically storage space which is accessible to the occupants in the vehicle interior. Occasionally storage compartments or the like are integrated in the vehicle seats, for example in the region of the rear seat bench. A corresponding adaptation of the seat structure, however, may be more complex relative to development and production. One possibility for providing additional storage space in the region of the rear seat bench, are seats in which a storage box is arranged below the seat surface. The seat surface typically forms a type of cover for the storage box where access to the storage box is possible by the seat surface being pivoted upwardly about a pivot axis which can be arranged either at the front on the seat surface or at the rear, as is known for example in the case of folding seats in cinemas.

It would be desirable to provide flexible and efficient use of storage space in the region of a vehicle seat.

SUMMARY OF THE DISCLOSURE

According to a first aspect of the present disclosure, a seat arrangement for a motor vehicle is provided. The seat arrangement for a motor vehicle includes a vehicle seat having a backrest and a seat part which is arranged in a seating position above a storage region and at least partially covers on an upper face an access opening to the storage region, which is configured in a seat substructure, and which is pivotable about a seat pivot axis into a folded-up position in order to uncover the access opening, and at least one storage container having a wall which is configured around a periphery to a side and on a lower face, the at least one storage container configured to be inserted into the storage region through the access opening and received therein to prevent displacement in a horizontal direction.

According to a second aspect of the present disclosure, a seat arrangement for a motor vehicle is provided. The seat arrangement for a motor vehicle includes a vehicle seat having a backrest and a seat part which is arranged in a seating position above a storage region and at least partially covers on an upper face an access opening to the storage region, which is configured in a seat substructure, and which is pivotable about a seat pivot axis into a folded-up position in order to uncover the access opening, wherein the seat part is connected to the seat substructure so as to be pivotable about the seat pivot axis. The seat arrangement also includes a storage container having a wall which is configured around a periphery to a side and on a lower face, the storage container configured to be inserted into the storage region through the access opening and received therein to prevent displacement in a horizontal direction, and wherein the seat substructure has an enclosure element which at least partially delimits the storage region, the storage container forming a positive connection therewith in the horizontal direction in an inserted state.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
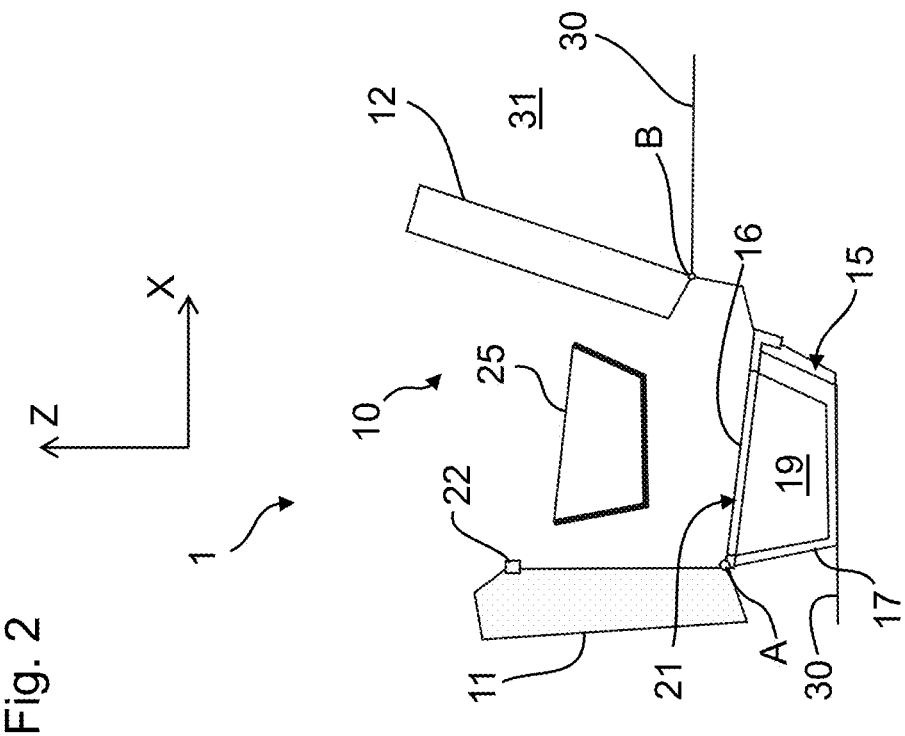
FIG. 1 is a schematic sectional view of a motor vehicle seat arrangement according to a first embodiment with a seat part in a seating position and showing a person seated thereon.

Parts which are equivalent relative to the function thereof are provided with the same reference numerals in the different figures, so that generally these parts are only described once.

FIG. 1 shows a seat arrangement 1 according to a first embodiment of a passenger motor vehicle. A vehicle seat 10, for example a rear seat bench, is connected to a vehicle floor 30 in a manner shown simplified and schematically here. The vehicle seat 10 is oriented toward the vehicle front and thus counter to a vehicle longitudinal axis or X-axis (facing to the rear). The vehicle seat has firstly a seat part 11 and secondly a backrest 12. A person 50 can sit down on the vehicle seat 10 so that their thighs rest partially and their buttocks rest on the seat part 11 and their back bears against on the backrest 12. The seat part 11 is arranged on a seat substructure 15 which has a seat frame 16, which is for example made of steel, and a trough 17 which can also be denoted as an enclosure element, which is made for example of plastics. The seat part 11 is supported on the seat frame 16 and is connected thereto via a seat pivot axis A which is arranged on the front side of the seat part 11. This seat pivot axis runs parallel to the vehicle transverse axis or Y-axis. The same applies to a backrest pivot axis B, the backrest 12 being pivotable about the backrest pivot axis relative to the vehicle floor 30. A boot 31 (or loading space), in which luggage, in particular, can be stored, is arranged at the rear of the vehicle seat 10.

The seat substructure 15 has a storage region 19 which is configured in the trough 17. The frame 16 defines an access opening 21 to the storage region 19. In FIG. 1 a storage container 25 which has a wall, which is configured around the periphery to the side and on the lower face and which can consist of plastics, for example, is arranged in the storage region 19. The shape of the storage container 25 and that of the trough 17 are adapted to one another such that the storage container 25 is positively received both along the X-axis and along the Y-axis and thus secured against horizontal displacement.

Figure 2:
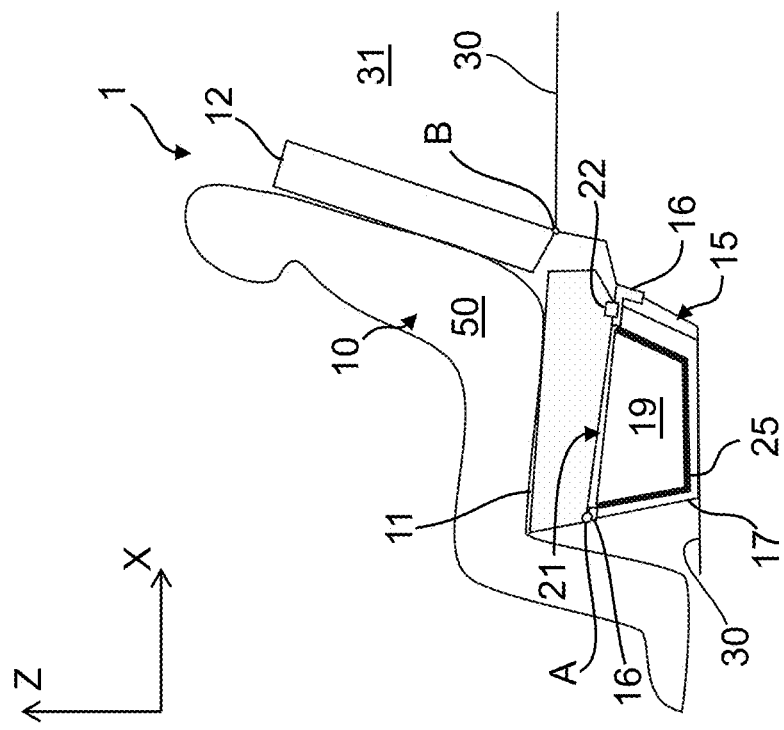
FIG. 2 is a schematic sectional view of the seat arrangement of FIG. 1 with the seat part in a folded-up position.

If the seat part 11 is arranged, as in FIG. 1, in a seating position, it covers the access opening 21 fully on the upper face, such that no access is possible to the storage region 19 or the storage container 25. In this case, the seat part 11 is blocked by a blocking element 22 on the seat frame 16. Alternatively, the blocking element 22 could also be omitted. When the blocking element has been released, the seat part 11 can be pivoted forward about the seat pivot axis A into a folded-up position, which is shown in FIG. 2. Now the storage region 19 with the storage container 25 is accessible via the access opening 21. Firstly, objects can be placed in the storage container 25 and removed therefrom. Secondly, as indicated in FIG. 2, the storage container 25 can be removed as a whole from the storage region 19 through the access opening 21. This is advantageous, in particular, in the case of a large number of small objects in the storage container 25. In a corresponding manner, the storage container 25 can be removed from the storage region 19 through the access opening 21.

Figure 3:
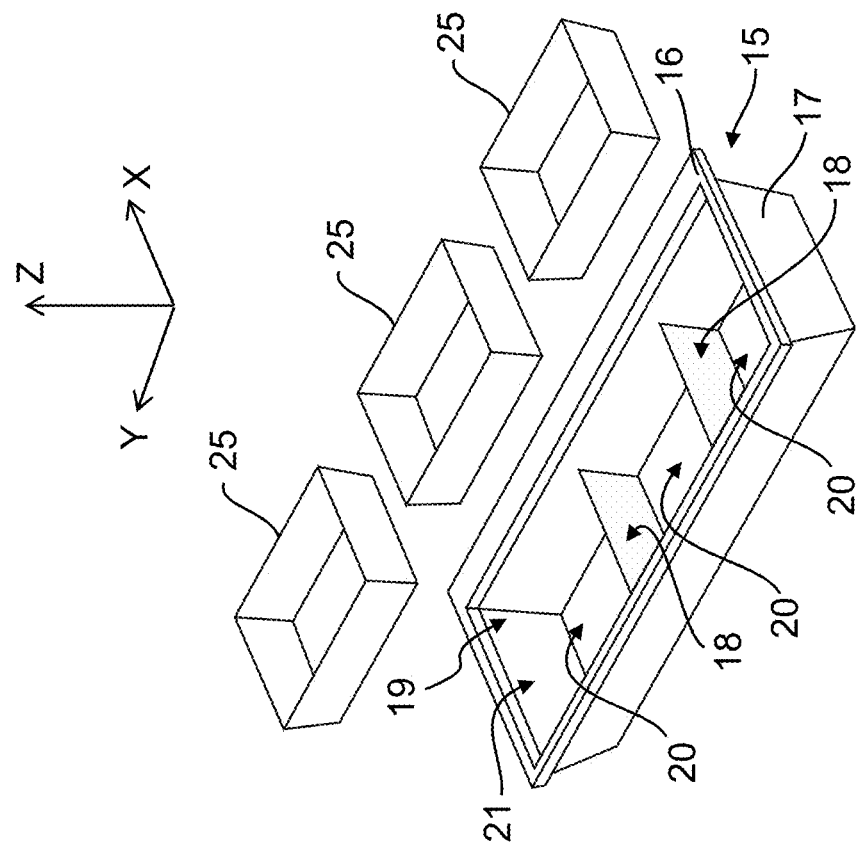
FIG. 3 is a schematic perspective view of a part of the seat arrangement of FIG. 1.

As can be identified in the perspective view of FIG. 3, the trough 17 has two partition walls 18 which divide the storage region 19 into the three sub-regions 20. Each of three storage containers 25 can be received in each sub-region 20. In this case, the access opening 21 is dimensioned such that each storage container 25 can be inserted and removed independently of the two others. The partition walls 18 assist with the correct positioning of individual storage containers 25 and secure these storage containers by a positive connection in the direction of the Y-axis.

Figure 4:
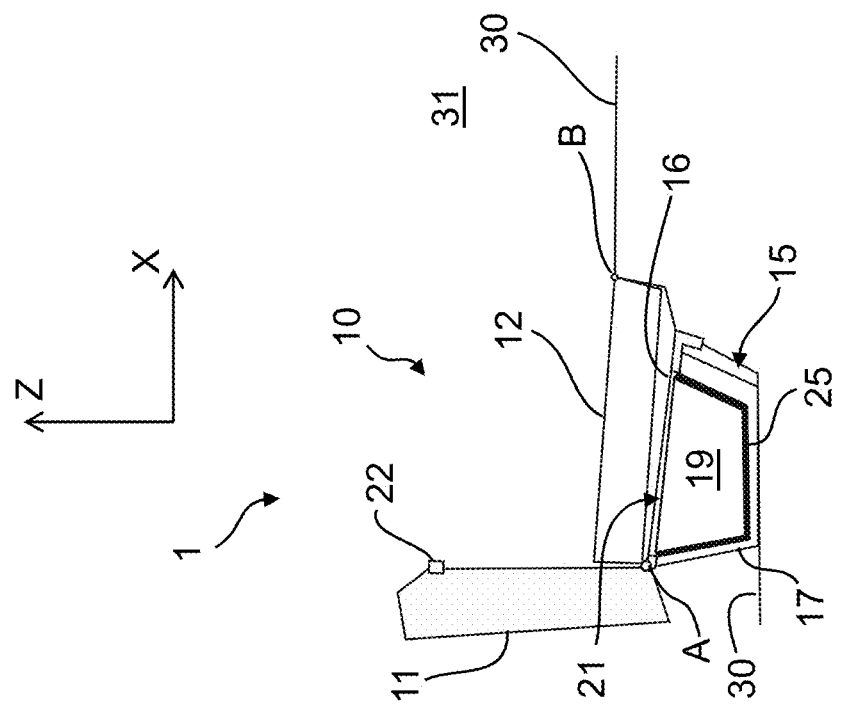
FIG. 4 is a schematic sectional view of the seat arrangement of FIG. 1 with the seat part in the folded-up position and a backrest in a reclined position.

If the volume of the boot 31 is to be increased, the backrest 12 can be pivoted about the backrest pivot axis B to the front into a reclined position, which is shown in FIG. 4. The rear face of the backrest 12 forms together with the vehicle floor 30 a continuous shelf surface for luggage items, or the like. A planar shelf surface can even be formed by the seat part 11 being pivoted into its folded-up position, wherein with its rear face the backrest 12 enlarges the shelf surface, in particular without an incline. In this case, the backrest 12 covers the access opening 21 fully and thus prevents small objects from being able to fall out of the boot 31 into the storage region 19.

Figure 6:
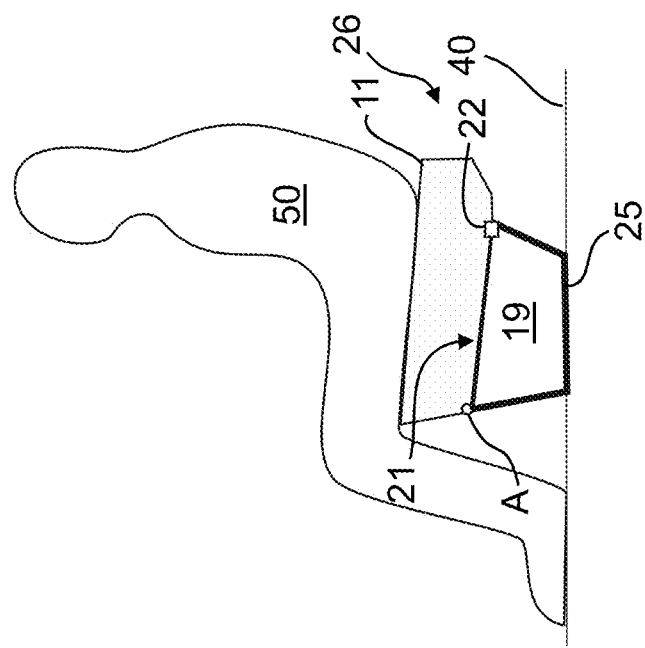
FIG. 6 is a schematic sectional view of a part of the seat arrangement of FIG. 5 and showing a person seated thereon.
Figure 5:
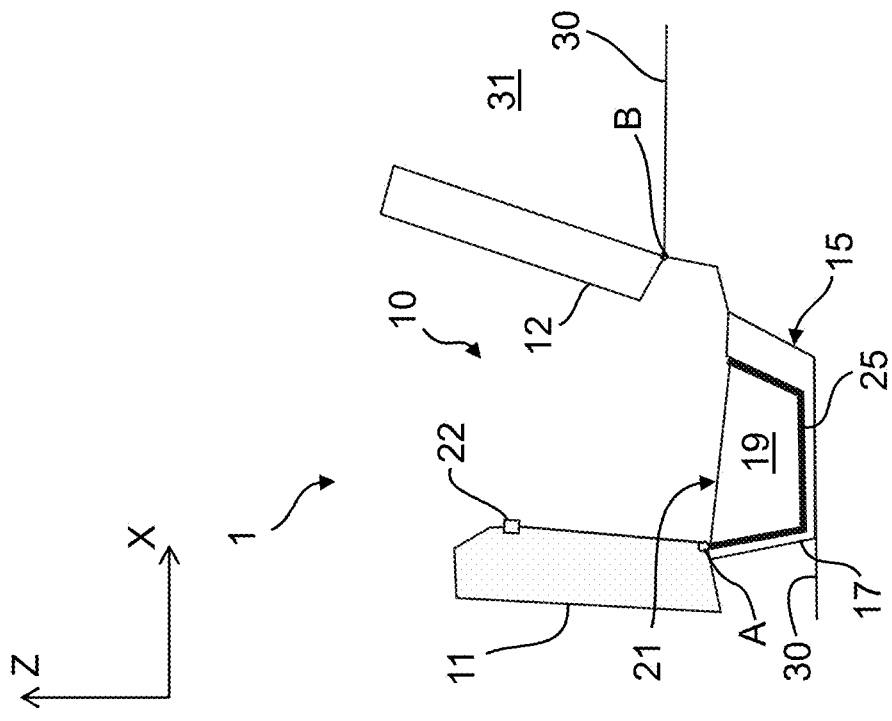
FIG. 5 is a schematic sectional view of a motor vehicle seat arrangement according to a second embodiment with a seat part in a folded-up position.

FIGS. 5 and 6 show a second embodiment of a seat arrangement 1. This differs from the first embodiment in that the seat part 11 is directly connected via the seat pivot axis A to a storage container 25. As shown in FIG. 5, the seat part 11 can be pivoted into a folded-up position in order to obtain access to the storage region 19 and the container 25. A pivoting of the backrest 12 into the reclined position is also possible in turn. In this example, the seat frame 16 is absent, but it could also be additionally provided, wherein naturally the pivotable connection to the seat part 11 would be dispensed with. The seat part 11 can be secured on the storage container 25 by a blocking element 22. The seat part 11 and the storage container 25 form a mobile seat unit 26 and, in particular in this blocked state, can be removed together from the seat substructure 15 and removed from the motor vehicle. As shown in FIG. 6, the storage container 25 is configured to be sufficiently stable such that it serves as a seat lower part and can bear the weight of the seat part 11 and a person 50 seated thereon. The person 50 can position the seat unit 26, including the seat part 11 and the storage container 25, at any point on the floor 40 and sit down thereon. In this case, temporary access to the interior of the storage container 25 is naturally also possible by releasing the blocking element 22. If the seat unit 26 corresponding to FIG. 5 is arranged in the motor vehicle, it can be secured, for example, via lockable locking elements, not shown here. These locking elements can ideally produce a connection between the storage container 25 and the vehicle floor 30.

It should be mentioned that the features and measures set forth individually in the following description can be combined together in any technically expedient manner and disclose further embodiments of the disclosure. The description characterizes and specifies the seat arrangement, in particular, additionally in connection with the figures.

A seat arrangement for a motor vehicle is provided in this disclosure. The motor vehicle can be, in particular, a passenger motor vehicle, for example a saloon car, an estate car, a minibus or people carrier, for example.

The seat arrangement has a vehicle seat with a seat part and a backrest. The vehicle seat can be a rear seat bench or a part of a rear seat bench of the motor vehicle. In the assembled state, the seat part has a seat surface for one or more occupants (or for the thighs and/or buttocks thereof). In this context, however, the term "seat part" not only refers to the element which is ready for use, including the seat cushion, cover, etc., but can also refer, for example, to a frame element and/or shell element on which the further elements are arranged. This could also be referred to as a seat base or a base part. In the assembled state, the backrest or the seat back has a support surface for the back of a person. In this context, the term "backrest" also does not necessarily include the component or the components on which the support surface is configured, i.e. generally the cushion elements. Rather, in this context the backrest can also have, for example, exclusively frame elements and/or shell elements on which the cushion elements are mounted in the assembled state. Both the backrest and the seat part can be divided into a plurality of portions or consist of a plurality of sub-elements, each thereof corresponding at least to the intended seat width of an occupant.

The seat part is arranged in a seating position above a storage region and at least partially covers on the upper face an access opening to the storage region which is configured in a seat substructure. The storage region or storage space is generally a region which is at least occasionally accessible and in which objects which are not fixedly installed in the vehicle can be accommodated. The storage region or storage space is configured in a lower region of the vehicle seat. More specifically relative to the seating position, the storage region is configured below the seat part. The seating position is that position in which an occupant can sit down as intended on the seat part and can lean against the backrest. In this seating position, the seat part at least partially covers on the upper face (from above) an access opening to the storage region. The seat part thus forms to a certain extent a cover on the upper face for the storage space, said cover entirely or partially covering the access opening. The access opening in turn is naturally configured on the upper face of the storage region or faces upwardly. The access opening is configured in a seat substructure, such that the seat substructure defines or delimits the access opening. The storage region adjoining the access opening can also be configured entirely or partially inside the seat substructure. The seat substructure is normally connected to the vehicle body in a non-releasable, stationary manner. In some circumstances, the seat substructure can be directly connected to the floor of a vehicle cab. The seat substructure can have at least to some extent a particularly high degree of stability and, for example, can have a seat frame which is made of steel and which is fastened to the floor of the cab and thus to the vehicle body.

The seat part is pivotable about a seat pivot axis into a folded-up position in order to uncover the access opening. The seat pivot axis normally runs parallel to the vehicle transverse direction (Y-direction) or transversely to the viewing direction defined by the vehicle seat. The seat pivot axis can be arranged on an end of the seat part facing the backrest, such that the folded-up position corresponds to a "cinema position" of the seat. In particular, the seat pivot axis can be arranged on an end of the seat part remote from the backrest such that the seat part can pivot upwards and to the front about the seat pivot axis. In any case, the access opening is uncovered by the pivoting movement, such that access to the storage region is possible.

According to the disclosure, the seat arrangement has at least one storage container with a wall which is configured around the periphery to the side and on the lower face. The respective storage container serves for receiving and storing different objects inside the motor vehicle. To this end, the storage container has a wall which extends around the periphery to the side and on the lower face. Relative to an orientation of the storage container as intended, the wall thus delimits this storage container vertically downwardly and horizontally on all sides. It goes without saying that the term "wall" in this case is to be understood only relative to the suitability of retaining objects inside the storage container. In this regard, the wall does not have to be closed without gaps but can have at least one opening or even a broken, optionally a net-like or mesh-like, structure. Normally, the wall is configured to be inherently rigid, for example made of plastics or metal, but it could also be configured to be partially flexible, for example with a rigid frame which holds a flexible element made of plastics film or textile material. Overall, the wall surrounds a container interior in which very different objects can be stored.

The respective storage container can be inserted into the storage region through the access opening and can be received therein so as to prevent displacement in the horizontal direction. In other words, the storage container and the access opening are adapted to one another such that the storage container is able to be inserted through the access opening into the storage region. Naturally, the storage container can also be removed again out of the storage region through the access opening. The storage container can be received inside the storage region so as to prevent displacement in the horizontal direction, such that it is secured against (significant) displacements in the horizontal direction. For example, the seat substructure can be configured to receive the storage container in the aforementioned manner so as to prevent displacement.

A storage space which is usable in a flexible manner is provided below the seat part. In particular, in this case it is advantageous if the at least one storage container can be secured inside the storage region, which is advantageous, in particular, in the case of high acceleration forces which act on the vehicle. Objects accommodated in the storage container can either be removed individually or the storage container can be removed as a whole from the storage region. The latter is advantageous, in particular, with a large number of small objects which can be transported securely in the storage container. The storage container can be accessed in a simple manner by folding up the seat part into the folded-up position. Naturally, it is also possible to accommodate objects in the storage region without using the storage container. The usable storage region is arranged below the seat part, and no structural alteration to the seat part or backrest is required in order to implement the disclosure. It is also advantageous if the seat substructure together with the access opening can be integrated in a simple manner in existing vehicle designs or seat designs. In this case, a fixedly installed seat shell of a conventional seat can be replaced by the described seat substructure, which does not involve a major or difficult alteration to the seat.

In order to permit a more flexible use of the storage region, the seat arrangement can have a plurality of storage containers which are able to be received adjacent to one another in the storage region. In other words, the storage containers are dimensioned such that they fit simultaneously in the storage region. The access opening may be dimensioned such that each of the storage containers can be inserted or removed independently of the others. In the case of a relatively large storage region (for example below a rear seat bench), it can be advantageous to provide a plurality of storage containers, each thereof per se being able to be handled more easily than a single large storage container. It might even be conceivable that different storage containers, for example a large container or a plurality of small containers, are able to be selectively arranged in the storage region or a part thereof, corresponding to a certain extent to a modular system.

Different options are available regarding the securing of the storage container. For example, the storage container could be secured via a latching connection or magnetically to the vehicle floor or to the seat substructure. A further option which is often able to be used more intuitively by the user is to secure the storage container against displacements via a positive connection. The storage region may be at least partially delimited by an enclosure element, the at least one storage container forming a positive connection therewith in the horizontal direction in the inserted state. The enclosure element could form a type of frame or side wall around the storage region. However, the enclosure element could also be trough-like, i.e., configured as a trough, and could delimit the storage region horizontally to the side and downwardly.

Advantageously, the storage region is divided by at least one partition element into a plurality of sub-regions, in each case a storage container being able to be inserted therein. In this case, the at least one sub-element can also be formed, for example, by the aforementioned enclosure element or can be configured integrally therewith. The partition elements can be configured, for example, as freestanding webs or walls. For example, the partition elements could divide a storage region below a rear seat bench in the transverse direction, wherein each partition element extends in the longitudinal direction. Naturally, the adjacently arranged storage containers can form in each case a positive connection with the partition element, whereby the storage containers are secured against displacement. Naturally, instead of a single storage container a plurality of storage containers could also be arrangeable or arranged in a sub-region.

According to one embodiment, the seat part is connected to the seat substructure so as to be pivotable about the seat pivot axis. This normally means that the seat part is connected (via the seat substructure) non-releasably to the vehicle body. It might also be possible, however, that the seat part could be decoupled from the seat substructure. In particular, if the seat substructure is connected to the vehicle body, for example to a cab floor, it forms a particularly stable base for the pivoting of the seat part.

It can also be advantageous if the seat part is supported on the seat substructure in the seating position. This applies, in particular, when connecting the seat substructure to the vehicle body, the seat substructure obtaining a particularly high degree of stability thereby. For example, the seat substructure can have a seat frame (typically made of steel) on which the seat part can be supported and which surrounds the access opening. Naturally, a support on the seat substructure is advantageous, in particular, when the seat part is pivotably connected to the seat substructure but can also be advantageous independently thereof.

It can also be advantageous if the seat part is able to be blocked relative to the seat substructure. A corresponding locking mechanism which prevents the seat part from being pivoted out of the seating position into the folded-up position can be provided. If the seat part is not connected to the seat substructure via the seat pivot axis, the locking mechanism can also prevent the seat part from being removed from the seat substructure. The locking mechanism could even be coupled to a mechanical or electronic lock, for example, so that unauthorized access to the storage region can be prevented.

It is also possible that the seat part is connected to a storage container so as to be pivotable about the seat pivot axis. In this case, the seat part and the storage container form a unit to a certain extent, whereas a permanent connection of the seat part to the seat substructure is not provided. The seat part forms to a certain extent a cover which is connected (normally permanently) to the storage container via the seat pivot axis. However, it might also be conceivable that the connection to the storage container is releasable, i.e. that the seat part can be decoupled therefrom in the region of the seat pivot axis.

One embodiment provides that the seat part and a storage container can be removed together as a mobile seat unit from the seat substructure, wherein the storage container is configured, standing on a floor, to bear the seat part as well as a person seated thereon. The seat part and the storage container can thus be removed from the seat substructure and, for example, completely removed from the motor vehicle, such that they form a mobile seat unit or a transportable seat. The storage container in this case is configured to be stable, such that it can function as a seat lower part and can support the seat part and a person seated thereon. On a lower face, the storage container has a standing surface or a plurality of feet by which it can stand on the floor. Thus, the vehicle occupant, for example when spending time outdoors, can also use his or her seat outdoors outside the vehicle. This embodiment is normally combined with the aforementioned embodiment, according to which the seat part is connected via the seat pivot axis to the storage container.

In particular, in the above-described embodiment, it is advantageous if the seat part and the storage container are able to be blocked against one another. This firstly simplifies the removal of the seat part and storage container together from the seat substructure, and secondly it enhances the stability of the transportable seat.

When the seat part is in the folded-up position, advantageously the backrest can be pivotable to the front relative to the seat substructure about a backrest pivot axis into a reclined position in which it at least partially covers the access opening on the upper face. The pivoting of the backrest serves to use the region of the seat arrangement as a shelf region, in particular for increasing an adjacent loading space or boot. In this case, the rear face of the backrest forms a shelf surface. To this end, the backrest is pivoted forward so that a pivoting movement takes place, the backrest being displaced at least substantially to the front (and downwardly) thereby. In order to prevent objects falling from the increased loading space into the storage region or into a transport container, it is preferred that the backrest entirely covers the access opening on the upper face.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seat arrangement for a motor vehicle, comprising:
a vehicle seat having a backrest and a seat part which is arranged in a seating position above a storage region and at least partially covers on an upper face an access opening to the storage region, which is configured in a seat substructure, and which is pivotable about a seat pivot axis into a folded-up position in order to uncover the access opening; and
at least one storage container having a wall which is configured around a periphery to a side and on a lower face, the at least one storage container configured to be inserted into the storage region through the access opening and received therein to prevent displacement in a horizontal direction, wherein the seat substructure has an enclosure element which at least partially delimits the storage region, the at least one storage container forming a positive connection therewith in the horizontal direction in an inserted state, wherein the seat substructure has at least one partition element which divides the storage region into a plurality of sub-regions, and wherein each sub-region is configured to receive a storage container.

2. The seat arrangement according to claim 1, wherein the seat part is connected to the seat substructure so as to be pivotable about the seat pivot axis.

3. The seat arrangement according to claim 2, wherein the seat part is supported on the seat substructure in the seating position.

4. The seat arrangement according to claim 3, wherein the seat part is configurable to be blocked relative to the seat substructure.

5. A seat arrangement for a motor vehicle, comprising:
a vehicle seat having a backrest and a seat part which is arranged in a seating position above a storage region and at least partially covers on an upper face an access opening to the storage region, which is configured in a seat substructure, and which is pivotable about a seat pivot axis into a folded-up position in order to uncover the access opening; and
at least one storage container having a wall which is configured around a periphery to a side and on a lower face, the at least one storage container configured to be inserted into the storage region through the access opening and received therein to prevent displacement in a horizontal direction, wherein the seat part is connected to the seat substructure so as to be pivotable about the seat pivot axis, wherein the seat part is supported on the seat substructure in the seating position, wherein the seat part is configurable to be blocked relative to the seat substructure, and wherein the seat part is connected to the at least one storage container so as to be pivotable about the seat pivot axis.

6. The seat arrangement according to claim 5, wherein the seat part and the at least one storage container can be removed together as a mobile seat unit from the seat substructure, and wherein the at least one storage container is configured, standing on a floor, to bear the seat part as well as a person seated thereon.

7. The seat arrangement according to claim 6, wherein the seat part and at least one storage container are configured to be blocked against one another.

8. The seat arrangement according to claim 1, wherein when the seat part is in the folded-up position, the backrest is pivotable to a front relative to the seat substructure about a backrest pivot axis into a reclined position in which it at least partially covers the access opening on the upper face.

9. A seat arrangement for a motor vehicle, comprising:
a vehicle seat having a backrest and a seat part which is arranged in a seating position above a storage region and at least partially covers on an upper face an access opening to the storage region, which is configured in a seat substructure, and which is pivotable about a seat pivot axis into a folded-up position in order to uncover the access opening, wherein the seat part is connected to the seat substructure so as to be pivotable about the seat pivot axis; and
a storage container having a wall which is configured around a periphery to a side and on a lower face, the storage container configured to be inserted into the storage region through the access opening and received therein to prevent displacement in a horizontal direction, wherein the seat substructure has an enclosure element which at least partially delimits the storage region, the storage container forming a positive connection therewith in the horizontal direction in an inserted state, wherein the seat substructure has at least one partition element which divides the storage region into a plurality of sub-regions, and wherein each sub-region is configured to receive a storage container.

10. The seat arrangement according to claim 9, wherein the seat part is supported on the seat substructure in the seating position.

11. The seat arrangement according to claim 10, wherein the seat part is configurable to be blocked relative to the seat substructure.

12. The seat arrangement according to claim 11, wherein the seat part is connected to a storage container so as to be pivotable about the seat pivot axis.

13. The seat arrangement according to claim 12, wherein the seat part and the storage container can be removed together as a mobile seat unit from the seat substructure, and wherein the storage container is configured, standing on a floor, to bear the seat part as well as a person seated thereon.

14. The seat arrangement according to claim 13, wherein the seat part and the storage container are configured to be blocked against one another.

15. The seat arrangement according to claim 9, wherein when the seat part is in the folded-up position, the backrest is pivotable to a front relative to the seat substructure about a backrest pivot axis into a reclined position in which it at least partially covers the access opening on the upper face.

* * * * *